US006453294B1

(12) United States Patent
Dutta et al.

(10) Patent No.: US 6,453,294 B1

(45) Date of Patent: Sep. 17, 2002

(54) DYNAMIC DESTINATION-DETERMINED MULTIMEDIA AVATARS FOR INTERACTIVE ON-LINE COMMUNICATIONS

(75) Inventors: Rabindranath Dutta, Austin; Michael A. Paolini, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 09/584,599

(22) Filed: May 31, 2000

(51) Int. Cl.[7] ......................... G10L 21/06; G10L 13/08; G10L 15/26

(52) U.S. Cl. .................... 704/270.1; 704/270; 704/275; 704/260; 704/235

(58) Field of Search ................................ 345/419–473; 704/259, 260, 270, 270.1, 275, 235

(56) References Cited

U.S. PATENT DOCUMENTS

| | | | | |
|---|---|---|---|---|
| 5,736,982 A | | 4/1998 | Suzuki et al. | 345/330 |
| 5,802,296 A | | 9/1998 | Morse et al. | 395/200.38 |
| 5,812,126 A | | 9/1998 | Richardson et al. | 345/330 |
| 5,841,966 A | | 11/1998 | Irribarren | 395/200 |
| 5,880,731 A | | 3/1999 | Liles et al. | 345/349 |
| 5,884,029 A | | 3/1999 | Brush, II et al. | 395/200.32 |
| 5,894,305 A | | 4/1999 | Needham | 345/329 |
| 5,894,307 A | | 4/1999 | Ohno et al. | 345/355 |
| 5,930,752 A | | 7/1999 | Kawaguchi et al. | 704/235 |
| 5,950,162 A | * | 9/1999 | Corrigan et al. | 704/260 |
| 5,956,038 A | * | 9/1999 | Rekimoto | 345/419 |
| 5,956,681 A | * | 9/1999 | Yamakita | 704/270.1 |
| 5,963,217 A | * | 10/1999 | Grayson et al. | 345/473 |
| 5,977,968 A | | 11/1999 | Le Blanc | 345/339 |
| 5,983,003 A | | 11/1999 | Lection et al. | 395/200.32 |

OTHER PUBLICATIONS

Seltzer ("Putting a Face on your Web Presence, Serving Customers On–Line", Business on the World Wide Web, Apr. 1997).*

Research Disclosure, *A Process for Customized Information Delivery*, Apr. 1998, p. 461.

Reserach Disclosure, *Method and System for Managing Network Deices via the WEB*, Oct. 1998, pp. 1367–1369.

* cited by examiner

*Primary Examiner*—Richemond Dorvil
*Assistant Examiner*—Daniel A Nolan
(74) *Attorney, Agent, or Firm*—Marilyn Smith Dawkins; Bracewell & Patterson, L.L.P.

(57) ABSTRACT

Transforms are used for transcoding input text, audio and/or video input to provide a choice of text, audio and/or video output. Transcoding may be performed at a system operated by the communications originator, an intermediate transfer point in the communications path, and/or at one or more system(s) operated by the recipient(s). Transcoding of the communications input, particular voice and image portions, may be employed to alter identifying characteristics to create an avatar for a user originating the communications input.

21 Claims, 5 Drawing Sheets

DYNAMIC DESTINATION-DETERMINED MULTIMEDIA AVATARS FOR INTERACTIVE ON-LINE COMMUNICATIONS

BACKGROUND OF THE INVENTION

1. Technical Field

The present invention generally relates to interactive communications between users and in particular to altering identifying attributes of a participant during interactive communications. Still more particularly, the present invention relates to altering identifying audio and/or video attributes of a participant during interactive communications, whether textual, audio or motion video.

2. Description of the Related Art

Individuals use aliases or "screen names" in chat rooms and instant messaging rather than their real name for a variety of reasons, not the least of which is security. An avatar, an identity assumed by a person, may also be used in chat rooms or instant messaging applications. While an alias typically has little depth and is usually limited to a name, an avatar may include many other attributes such as physical description (including gender), interests, hobbies, etc. for which the user provides inaccurate information in order to create an alternate identity.

As available communications bandwidth and processing power increases while compression/transmission techniques simultaneously improve, the text-based communications employed in chat rooms and instant messaging is likely to be enhanced and possibly replaced by voice or auditory communications or by video communications. Audio and video communications over the Internet are already being employed to some extent for chat rooms, particularly those providing adult-oriented content, and for Internet telephony. "Web" motion video cameras and video cards are becoming cheaper, as are audio cards with microphones, so the movement to audio and video communications over the Internet is likely to expand rapidly.

For technical, security, and aesthetic reasons, a need exists to allow users control over the attributes of audio and/or video communications. It would also be desirable to allow user control over identifying attributes of audio and video communications to create avatars substituting for the user.

SUMMARY OF THE INVENTION

It is therefore one object of the present invention to improve interactive communications between users.

It is another object of the present invention to alter identifying attributes of a participant during interactive communications.

It is yet another object of the present invention to alter identifying audio and/or video attributes of a participant during interactive communications, whether textual, audio or motion video.

The foregoing objects are achieved as is now described. Transforms are used for transcoding input text, audio and/or video input to provide a choice of text, audio and/or video output. Transcoding may be performed at a system operated by the communications originator, an intermediate transfer point in the communications path, and/or at one or more system(s) operated by the recipient(s). Transcoding of the communications input, particular voice and image portions, may be employed to alter identifying characteristics to create an avatar for a user originating the communications input.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
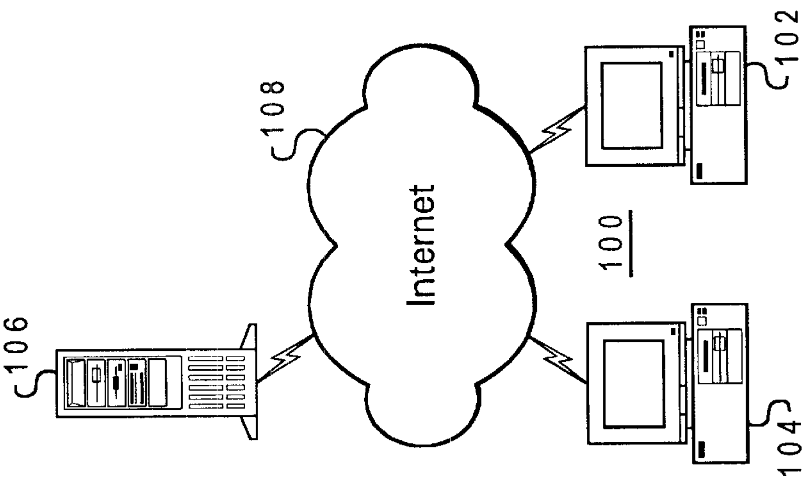
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 100 includes at least two client systems 102 and 104 and a communications server 106 communicating via the Internet 108 in accordance with the known art. Accordingly, clients 102 and 104 and server 106 communicate utilizing HyperText Transfer Protocol (HTTP) data transactions and may exchange HyperText Markup Language (HTML) documents, Java applications or applets, and the like.

Communications server 106 provides "direct" communications between clients 102 and 104—that is, the content received from one client is transmitted directly to the other client without "publishing" the content or requiring the receiving client to request the content. Communications server 106 may host a chat facility or an instant messaging facility or may simply be an electronic mail server. Content may be simultaneously multicast to a significant number of clients by communications server 106, as in the case of a chat room. Communications server 106 enables clients 102 and 104 to communicate, either interactively in real time or serially over a period of time, through the medium of text, audio, video or any combination of the three forms.

Figure 2A:
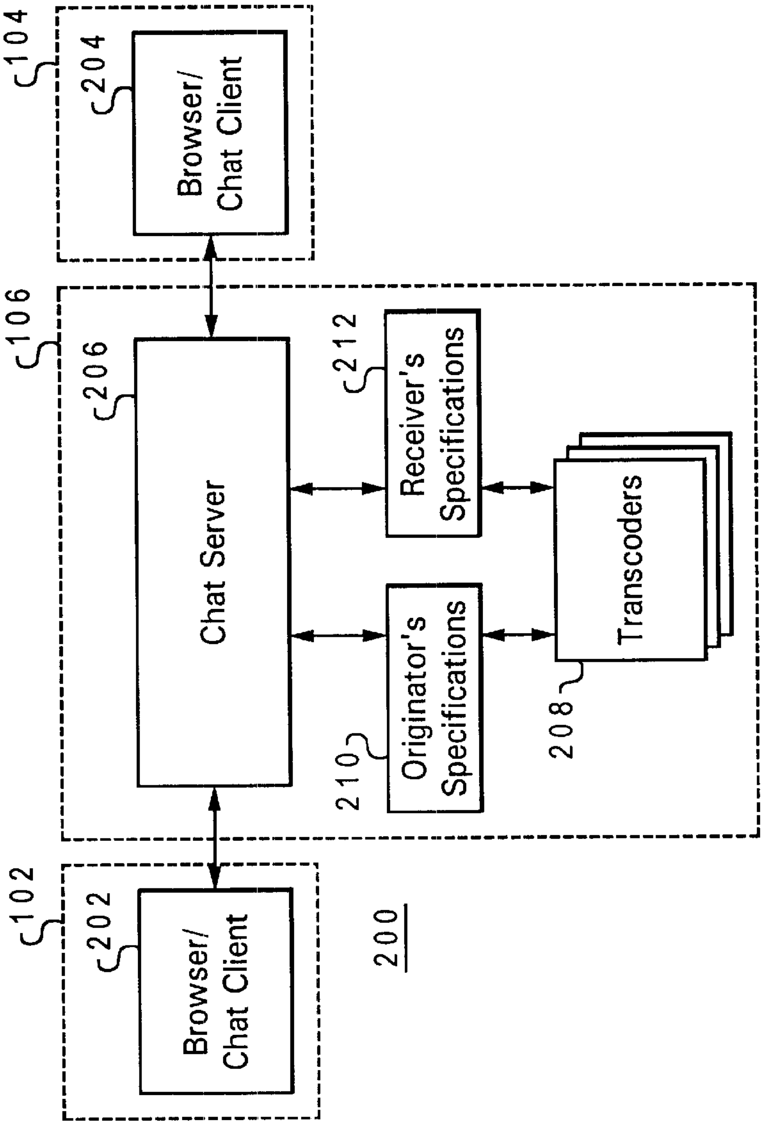
FIGS. 2A–2C are block diagrams of a system for providing communications avatars in accordance with a preferred embodiment of the present invention.
Figure 2B:
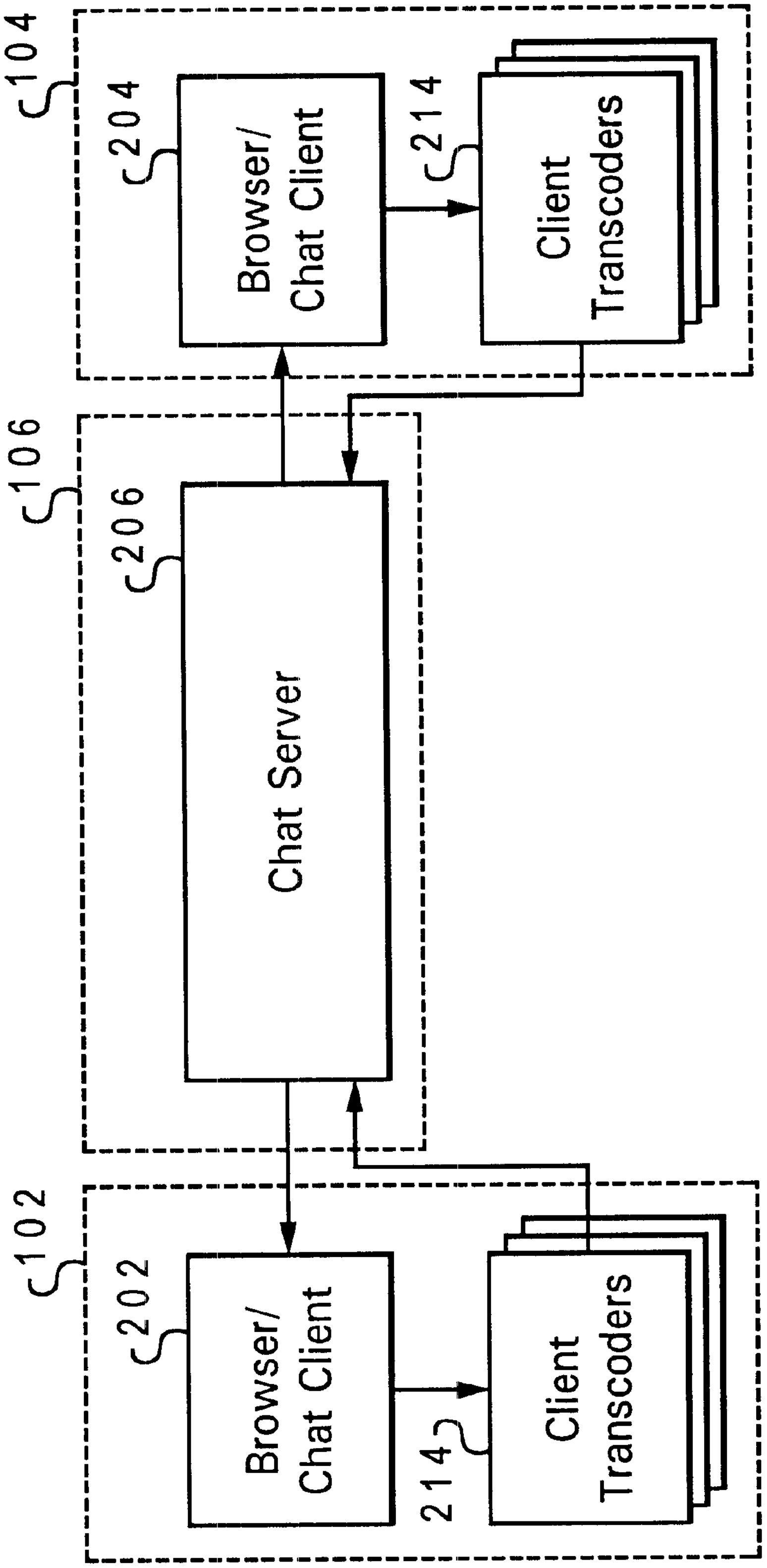
Figure 2C:
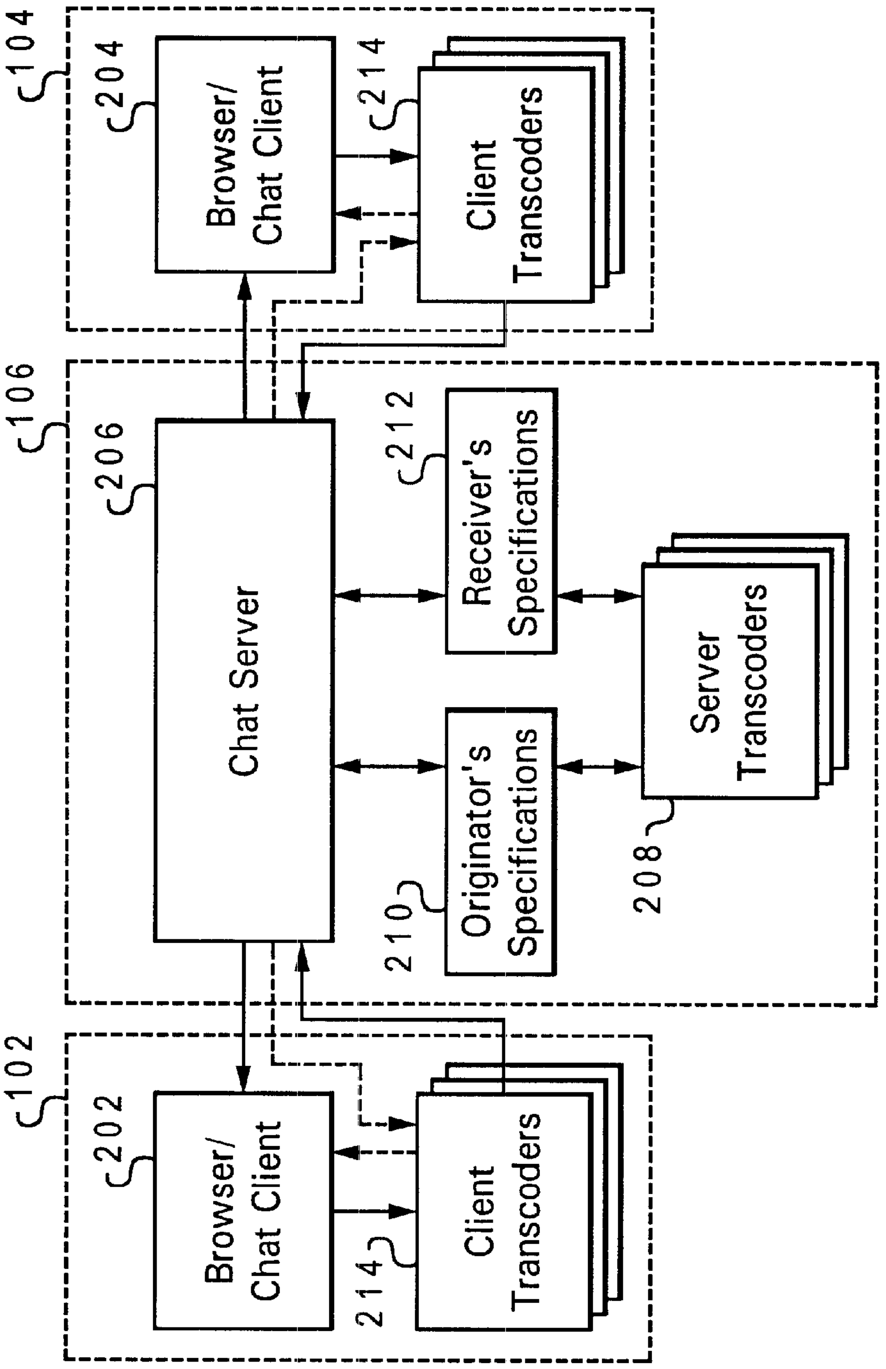

Referring to FIGS. 2A through 2C, block diagrams of a system for providing communications avatars in accordance with a preferred embodiment of the present invention are illustrated. The exemplary embodiment, which relates to a chat room implementation, is provided for the purposes of explaining the invention and is not intended to imply any limitation. System 200 as illustrated in FIG. 2A includes browsers with chat clients 202 and 204 executing within clients 102 and 104, respectively, and a chat server 206 executing within communications server 106. Communications input received from chat clients 202 and 204 by chat server 206 is multicast by chat server 206 to all participating users, including clients 202 and 204 and other users.

In the present invention, system 200 includes transcoders 208 for converting communications input into a desired communications output format. Transcoders 208 alter properties of the communications input received from one of clients 202 and 204 to match the originator's specifications 210 and also to match the receiver's specifications 212. Because communications capabilities may vary (i.e., communications access bandwidth may effectively preclude receipt of audio or video), transcoders provide a full range of conversions as illustrated in Table I:

TABLE I

| | Receives Audio | Receives Text | Receives Video |
|---|---|---|---|
| Origin Audio | Audio-to-Audio | Audio-to-Text | Audio-to-Video |
| Origin Text | Text-to-Audio | Text-to-Text | Text-to-Video |
| Origin Video | Video-to-Audio | Video-to-Text | Video-to-Video |

Through audio-to-audio (speech-to-speech) transcoding, the speech originator is provided with control over the basic presentation of their speech content to a receiver, although the receiver may retain the capability to adjust speed, volume and tonal controls in keeping with basic sound system manipulations (e.g. bass, treble, midrange). Intelligent speech-to-speech transforms alter identifying speech characteristics and patterns to provide an avatar (alternative identity) to the speaker. Natural speech recognition is utilized for input, which is contextually mapped to output. As available processing power increases and natural speech recognition techniques improve, other controls may be provided such as contextual mapping of speech input to a different speech characteristics—such as adding, removing or changing an accent (e.g., changing a Southern U.S. accent to a British accent), changing a child's voice to an adult's or vice versa, and changing a male voice to a female voice or vice versa—or to a different speech pattern (e.g., changing a New Yorker's speech pattern to a Londoner's speech pattern).

For audio-to-text transcoding the originator controls the manner in which their speech is interpreted by a dictation program, including, for example, recognition of tonal changes or emphasis on a word or phrase which is then placed in boldface, italics or underlined in the transcribed text, and substantial increases in volume resulting in the text being transcribed in all capital characters. Additionally, intelligent speech to text transforms would transcode statements or commands to text shorthand, subtext or "emoticon". Subtext generally involves delimited words conveying an action (e.g., "<grin>") within typed text. Emoticons utilize various combinations of characters to convey emotions or corresponding facial expressions or actions. Examples include: :) or :-) or :-D or d;^) for smiles,:(for a frown, ;-) or; -D for a wink; -P for a "raspberry" (sticking out tongue), and :-|, :-> or :-x for miscellaneous expressions; With speech-to-text transcoding in the present invention, if the originator desired to present a smile to the receiver, the user might state "big smile", which the transcoder would recognize as an emoticon command and generate the text ":-D". Similarly, a user stating "frown" would result in the text string ":-(" within the transcribed text.

For text-to-audio transcoding, the user is provided with control over the initial presentation of speech to the receiver. Text-to-audio transcoding is essentially the reverse of audio-to-text transcoding in that text entered in all capital letters would be converted to increased volume on the receiving end. Additionally, short hand chat symbols (emoticons) would convert to appropriate sounds (e.g., ":-P" would convert to a raspberry sound). Additionally, some aspects of speech-to-speech transcoding may be employed, to generate a particular accent or age/gender characteristics. The receiver may also retain rights to adjust speed, volume, and tonal controls in keeping with basic sound system manipulations (e.g. bass, treble, midrange).

Text-to-text transcoding may involve translation from one language to another. Translation of text between languages is currently possible, and may be applied to input text converted on the fly during transmission. Additionally, text-to-text conversion may be required as an intermediate step in audio-to-audio transcoding between languages, as described in further detail below.

Audio-to-video and text-to-video transcoding may involve computer generated and controlled video images, such as anime (animated cartoon or caricature images) or even realistic depictions. Text or spoken commands (e.g., "<grin>" or "<wink>") would cause generated images to perform the corresponding action.

For video-to-audio and video-to-text transcoding, origin video typically includes audio (for example, within the well-known layer 3 of the Motion Pictures Expert Group specification, more commonly referred to as "MP3"). For video-to-audio transcoding, simple extraction of the audio portion maybe performed, or the audio track may also be transcoded for utilizing the audio-to-audio transcoding techniques described above. For video-to-text transcoding, the audio track may be extracted and transcribed utilizing audio-to-text coding techniques described above.

Video-to-video transcoding may involve simple digital filtering (e.g., to change hair color) or more complicated conversions of video input to corresponding computer generated and controlled video images described above in connection with audio-to-video and text-to-video transcoding.

In the present invention, communication input and reception modes are viewed as independent. While the originator may transmit video (and embedded audio) communications input, the receiver may lack the ability to effectively receive either video or audio. Chat server 206 thus identifies the input and reception modes, and employs transcoders 208 as appropriate. Upon "entry" (logon) to a chat room, participants such as clients 202 and 204 designate both the input and reception modes for their participation, which may be identical or different (i.e., both send and receive video, or send text and receive video). Server 206 determines which transcoding techniques described above are required for all input modes and all reception modes. When input is received, server 206 invokes the appropriate transcoders 208 and multicasts the transcoded content to the appropriate receivers.

Figure 3:
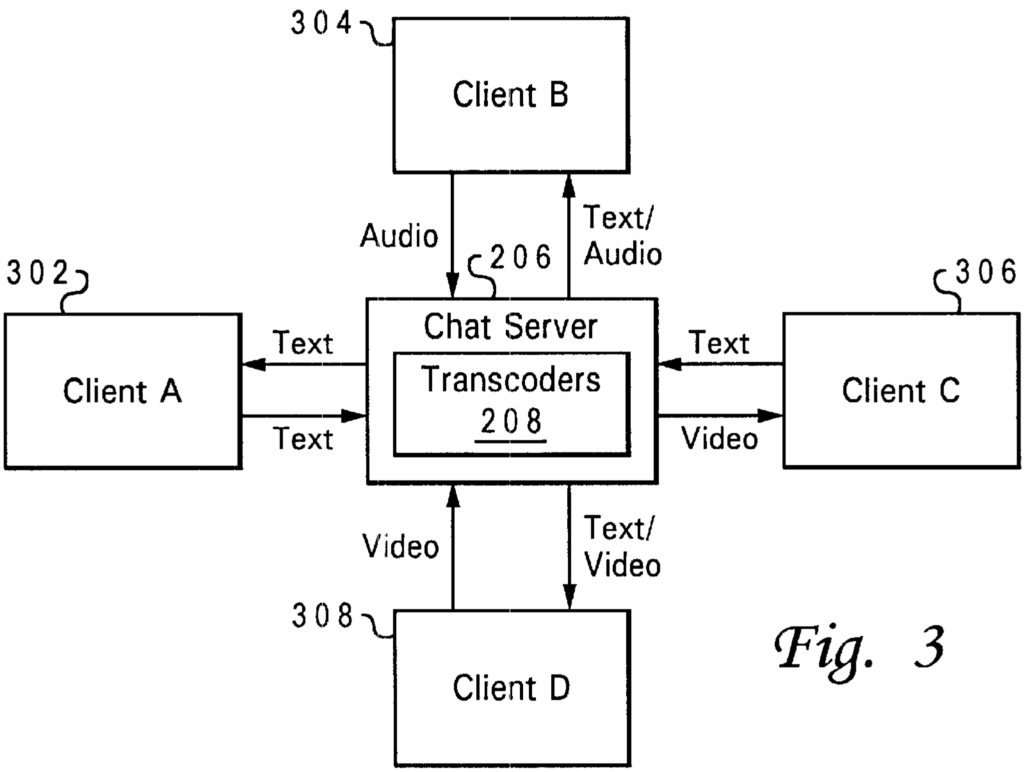
FIG. 3 depicts a block diagram of communications transcoding among multiple clients in accordance with a preferred embodiment of the present invention.

With reference now to FIG. 3, a block diagram of communications transcoding among multiple clients in accordance with a preferred embodiment of the present invention is depicted. Chat server 206 utilizes transcoders 208 to transform communications input as necessary for multicasting to all participants. In the example depicted, four clients 302, 304, 306 and 308 are currently participating in the active chat session. Client A 302 specifies text-based input to chat server 206, and desires to receive content in text form. Client B 304 specifies audio input to chat server 206, and desires to receive content in both text and audio forms. Client C 306 specifies text-based input to chat server 206, and desires to receive content in video mode. Client D 308 specifies video input to chat server 206, and desires to receive content in both text and video modes.

Under the circumstances described, chat server 206, upon receiving text input from client A 302, must perform text-to-audio and text-to-video transcoding on the received input, then multicast the transcoded text form of the input content to client A 302, client B 304, and client D 308, transmit the transcoded audio mode content to client B 308, and multicast the transcoded video mode content to client C 306 and client D 308. Similarly, upon receiving video mode input from client D 308, server 206 must initiate at least video-to-text and video-to-audio transcoding, and perhaps video-to-video transcoding, then multicast the transcoded text mode content to client A 302, client B 304, and client D 308, transmit the transcoded audio mode content to client B 308, and multicast the (transcoded) video mode content to client C 306 and client D 308.

Figure 4:
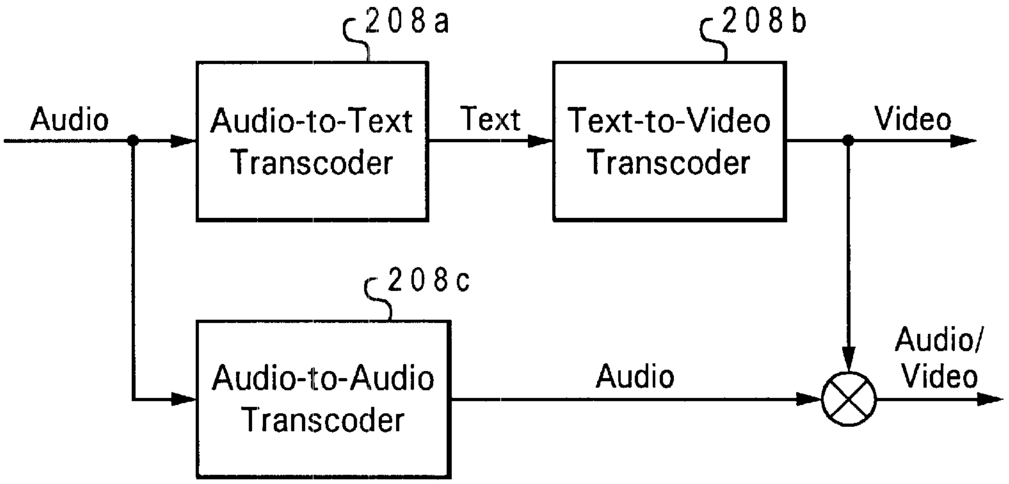
FIG. 4 is a block diagram of serial and parallel communications transcoding in accordance with a preferred embodiment of the present invention.

Referring back to FIG. 2A, transcoders 206 may be employed serially or in parallel on input content. FIG. 4 depicts serial transcoding of audio mode input to obtain video mode content, using audio-to-text transcoder 208*a* to obtain intermediate text mode content and text-to-video transcoder 208b to obtain video mode content. FIG. 4 also depicts parallel transcoding of the audio input utilizing audio-to-audio transcoder 208*c* to alter identifying characteristics of the audio content. The transcoded audio is recombined with the computer-generated video to achieve the desired output.

By specifying the manner in which input is to be transcoded for all three output forms (text, audio and video), a user participating in a chat session on chat server 206 may create avatars for their audio and video representations. It should be noted, however, that the processing requirements for generating these avatars through transcoding as described above could overload a server. Accordingly, as shown in FIG. 2B and 2C, some or all of the transcoding required to maintain an avatar for the user may be transferred to the client systems 102 and 104 through the use of client-based transcoders 214. Transcoders 214 may be capable of performing all of the A different types of transcoding described above prior to transmitting content to chat server 206 for multicasting as appropriate. The elimination of transcoders 208 at the server 106 may be appropriate where, for example, content is received and transmitted in all three modes (text, audio and video) to all participants, which selectively utilize one or more modes of the content. Retention of server transcoders 208 may be appropriate, however, where different participants have different capabilities (i.e., one or more participants can not receive video transmitted without corresponding transcoded text by another participant).

Figure 5:
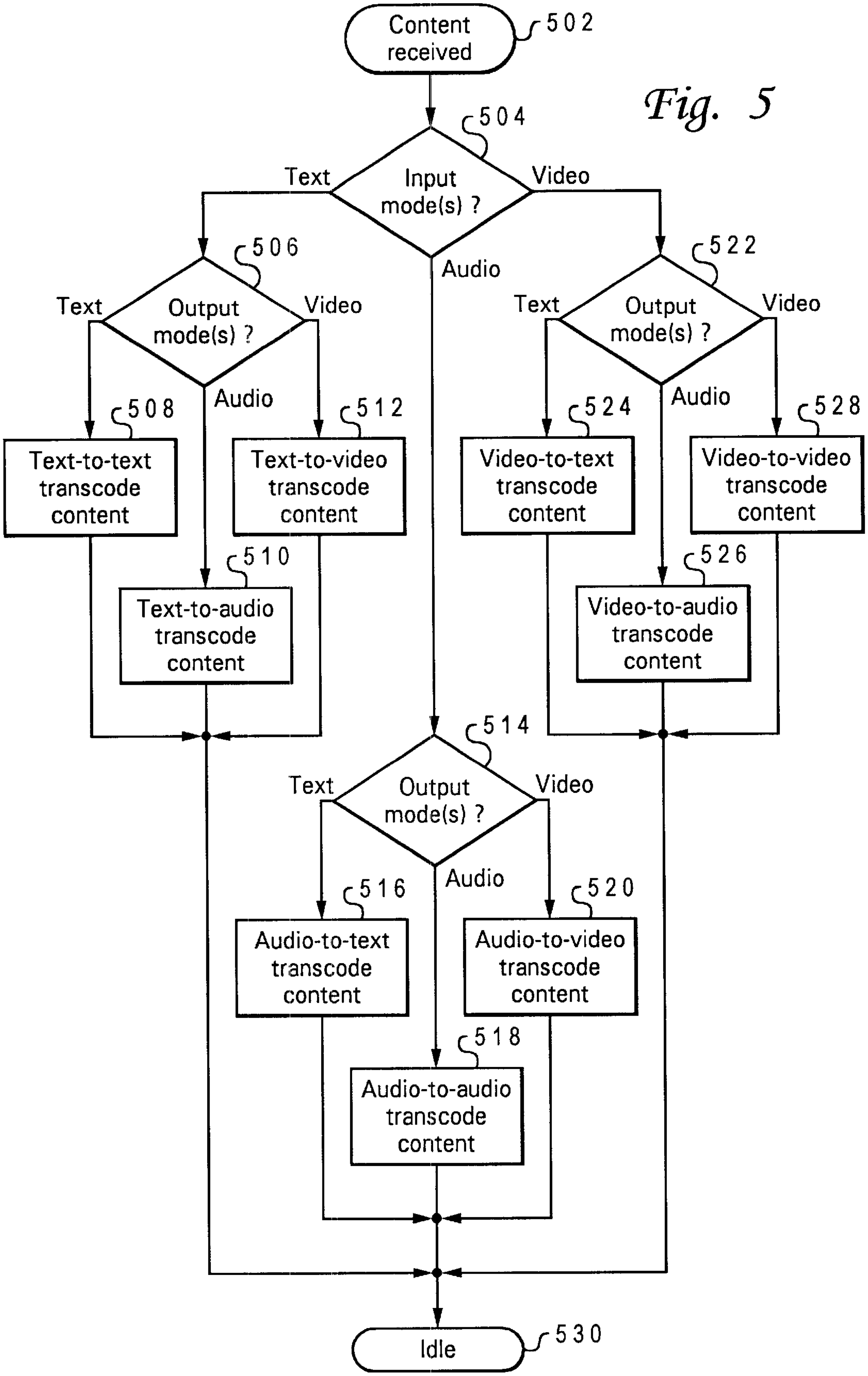
FIG. 5 depicts a high level flow chart for a process of transcoding communications content to create avatars in accordance with a preferred embodiment of the present invention.

With reference now to FIG. 5, a high level flow chart for a process of transcoding communications content to create avatars in accordance with a preferred embodiment of the present invention is depicted. The process begins at step 502, which depicts content being received for transmission to one or more intended recipients. The process passes first to step 504, which illustrates determining the input mode(s) (text, speech or video) of the received content.

If the content was received in at least text-based form, the process proceeds to step 506, which depicts a determination of the desired output mode(s) in which the content is to be transmitted to the recipient. If the content is to be transmitted in at least text form, the process then proceeds to step 508, which illustrates text-to-text transcoding of the received content. If the content is to be transmitted in at least audio form, the process then proceeds to step 510, which depicts text-to-audio transcoding of the received content. If Dent. the content is to be transmitted in at least video form, the process then proceeds to step 512, which illustrates text-to-video transcoding of the received content.

Referring back to step 504, if the received content is received in at least audio mode, the process proceeds to step 514, which depicts a determination of the desired output mode(s) in which the content is to be transmitted to the recipient. If the content is to be transmitted in at least text form, the process then proceeds to step 516, which illustrates audio-to-text transcoding of the received content. If the content is to be transmitted in at least audio form, the process then proceeds to step 518, which depicts audio-to-audio transcoding of the received content. If the content is to be transmitted in at least video form, the process then proceeds to step 520, which illustrates audio-to-video transcoding of the received content.

Referring again to step 504, if the received content is received in at least video mode, the process proceeds to step 522, which depicts a determination of the desired output mode(s) in which the content is to be transmitted to the recipient. If the content is to be transmitted in at least text form, the process then proceeds to step 524, which illustrates video-to-text transcoding of the received content. If the content is to be transmitted in at least audio form, the process then proceeds to step 526, which depicts video-to-audio transcoding of the received content. If the content is to be transmitted in at least video form, the process then proceeds to step 528, which illustrates video-to-video transcoding of the received content.

From any of steps 508, 510, 512, 516, 518, 520, 524, 526, or 528, the process passes to step 530, which depicts the process becoming idle until content is once again received for transmission. The process may proceed down several of the paths depicted in parallel, as where content is received in both text and audio modes (as where dictated input has previously been transcribed) or is desired in both video and text mode (for display with the text as "subtitles"). Additionally, multiple passes through the process depicted may be employed during the course of transmission of the content to the final destination.

The present invention provides three points for controlling communications over the Internet: the sender, an intermediate server, and the receiver. At each point, transforms may modify the communications according to the transcoders available to each. Communications between the sender and receiver provide two sets of modifiers which may be applied to the communications content, and introduction of an intermediate server increases the number of combinations of transcoding which may be performed. Additionally, for senders and receivers that do not have any transcoding capability, the intermediate server provides the resources to modify and control the communications. Whether performed by the sender or the intermediate server, however, transcoding may be utilized to create an avatar for the sender.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for controlling communications, comprising:

receiving communications content and determining a text, audio, or video input mode of the content;

determining a user-specified text, audio, or video output mode for the content for delivering the content to a destination; and transcoding the content from the text, audio, or video input mode to the user-specified text, audio, or video output mode prior to delivering the content to the destination utilizing a transcoder selected from the group consisting of a text-to-text transcoder, a text-to-audio transcoder, a text-to-video transcoder, an audio-to-text transcoder, an audio-to-audio transcoder, an audio-to-video transcoder, a video-to-text transcoder, a video-to-audio transcoder, and a video-to-video transcoder.

2. The method of claim 1, wherein the step of transcoding the content from the text, audio, or video input mode to the user-specified text, audio, or video output mode prior to delivering the content to the destination further comprises:

transcoding the content at a system at which the content is initially received.

3. The method of claim 1, wherein the step of transcoding the content from the text, audio, or video input mode to the user-specified text, audio, or video output mode prior to delivering the content to the destination further comprises:

transcoding the content at a system intermediate to a system at which the content is initially received and a system to which the content is delivered.

4. The method of claim 1, wherein the step of transcoding the content from the text, audio, or video input mode to the user-specified text, audio, or video output mode prior to delivering the content to the destination further comprises:

transcoding the content at a system to which the content is delivered.

5. The method of claim 1, wherein the step of transcoding the content from the text, audio, or video input mode to the user-specified text, audio, or video output mode prior to delivering the content to the destination further comprises:

creating an avatar for an originator of the content by altering identifying characteristics of the content.

6. The method of claim 5, wherein the step of creating an avatar for an originator of the content by altering identifying characteristics of the content further comprises:

altering speech characteristics of the originator.

7. The method of claim 5, wherein the step of creating an avatar for an originator of the content by altering identifying characteristics of the content further comprises:

altering pitch, tone, bass or mid-range of the content.

8. A system for controlling communications, comprising:

means for receiving communications content and determining a text, audio, or video input mode of the content;

means for determining a user-specified text, audio, or video output mode for the content for delivering the content to a destination; and means for transcoding the content from the text, audio, or video input mode to the user-specified text, audio, or video output mode prior to delivering the content to the destination utilizing a transcoder selected from the group consisting of a text-to-text transcoder, a text-to-audio transcoder, a text-to-video transcoder, an audio-to-text transcoder, an audio-to-audio transcoder, an audio-to-video transcoder, a video-to-text transcoder, a video-to-audio transcoder, and a video-to-video transcoder.

9. The system of claim 8, wherein the means for transcoding the content from the text, audio, or video input mode to the user-specified text, audio, or video output mode prior to delivering the content to the destination further comprises:

means for transcoding the content at a system at which the content is initially received.

10. The system of claim 8, wherein the means for transcoding the content from the text, audio, or video input mode to the user-specified text, audio, or video output mode prior to delivering the content to the destination further comprises:

means for transcoding the content at a system intermediate to a system at which the content is initially received and a system to which the content is delivered.

11. The system of claim 8, wherein the means for transcoding the content from the text, audio, or video input mode to the user-specified text, audio, or video output mode prior to delivering the content to the destination further comprises:

means for transcoding the content at a system to which the content is delivered.

12. The system of claim 8, wherein the means for transcoding the content from the text, audio, or video input mode to the user-specified text, audio, or video output mode prior to delivering the content to the destination further comprises:

means for creating an avatar for an originator of the content by altering identifying characteristics of the content.

13. The system of claim 12, wherein the means for creating an avatar for an originator of the content by altering identifying characteristics of the content further comprises:

means for altering speech characteristics of the originator.

14. The system of claim 12, wherein the means for creating an avatar for an originator of the content by altering identifying characteristics of the content further comprises:

means for altering pitch, tone, bass or mid-range of the content.

15. A computer program product within a computer usable medium for controlling communications, comprising:

instructions for receiving communications content and deter a text, audio, or video input mode of the content;

instructions for determining a user-specified text, audio, or video output mode for the content for delivering the content to a destination; and instructions for transcoding the content from the text, audio, or video input mode to the user-specified text, audio, or video output mode prior to delivering the content to the destination utilizing a transcoder selected from the group consisting of a text-to-text transcoder, a text-to-audio transcoder, a text-to-video transcoder, an audio-to-text transcoder, an audio-to-audio transcoder, and audio-to-video transcoder, a video-to-text transcoder, a video-to-audio transcoder, and a video-to-video transcoder.

16. The computer program product of claim 15, wherein the instructions for transcoding the content from the text, audio, or video input mode to the user-specified text, audio, or video output mode prior to delivering the content to the destination further comprises: instructions for transcoding the content at a system at which the content is initially received.

17. The computer program product of claim 15, wherein the instructions for transcoding the content from the text, audio, or video input mode to the user-specified text, audio, or video output mode prior to delivering the content to the destination further comprises:

instructions for transcoding the content at a system intermediate to a system at which the content is initially received and a system to which the content is delivered.

18. The computer program product of claim 15, wherein the instructions for transcoding the content from the text, audio, or video input mode to the user-specified text, audio, or video output mode prior to delivering the content to the destination further comprises:

instructions for transcoding the content at a system to which the content is delivered.

19. The computer program product of claim 15, wherein the instructions for transcoding the content from the text, audio, or video input mode to the user-specified text, audio, or video output mode prior to delivering the content to the destination further comprises:

instructions for creating an avatar for an originator of the content by altering identifying characteristics of the content.

20. The computer program product of claim 19, wherein the instructions for creating an avatar for an originator of the content by altering identifying characteristics of the content further comprises:

instructions for altering speech characteristics of the originator.

21. The computer program product of claim 19, wherein the instructions for creating an avatar for an originator of the content by altering identifying characteristics of the content further comprises:

instructions for altering pitch, tone, bass or mid-range of the content.

* * * * *

UNITED STATES PATENT AND TRADEMARK OFFICE

CERTIFICATE OF CORRECTION

PATENT NO. : 6,453,294 B1
DATED : September 17, 2002
INVENTOR(S) : Dutta et al.

It is certified that error appears in the above-identified patent and that said Letters Patent is hereby corrected as shown below:

Column 5,
Line 64, please delete "Dent".

Signed and Sealed this

Eleventh Day of March, 2003

JAMES E. ROGAN
*Director of the United States Patent and Trademark Office*